(12) United States Patent
Cheng

(10) Patent No.: US 6,381,070 B1
(45) Date of Patent: Apr. 30, 2002

(54) METHOD AND APPARATUS FOR LIGHTING

(76) Inventor: Alexander L. Cheng, 11 Springdale Ave., White Plains, NY (US) 10604

(*) Notice: Subject to any disclaimer, the term of this patent is extended or adjusted under 35 U.S.C. 154(b) by 0 days.

(21) Appl. No.: 09/383,859

(22) Filed: Aug. 26, 1999

(51) Int. Cl.[7] .................. G02B 17/00; G02B 27/00; G02B 5/00; G02B 7/00
(52) U.S. Cl. .................. 359/591; 359/593; 359/598; 359/894
(58) Field of Search .................. 359/593, 597, 359/598, 591, 894

(56) References Cited

U.S. PATENT DOCUMENTS 4,389,085 A * 6/1983 Mori .................. 359/591
4,576,436 A * 3/1986 Daniel .................. 385/25

OTHER PUBLICATIONS

Littlefair, Paul J. "Innovative daylighting: Review of systems and evaluation methods". Lighting Research and Technology 22(1) 1–17 (1990).*

* cited by examiner

Primary Examiner—Christopher E. Mahoney
Assistant Examiner—Magda Cruz

(57) ABSTRACT

A method and apparatus for a lighting system with light collection from a plurality of light sources including natural sunlight, distribution and control of said plurality of light sources, and a network of optical fibers and other components connecting said plurality of light sources and a plurality of lighting fixtures is disclosed. Sunlight is collected and integrated with other lighting sources to be distributed via a network of optical fiber cables and optical components. An unlimited combination of light collectors, distribution networks, and fixtures, is available for lighting system designs. The distribution network can run in and/or alongside wiring ducts for ease of maintenance and access. According to the time-of-day, time-of-year, weather condition, personal preference and presence, etc., control is provided at various locations for light collection, distribution, and lighting effect with brightness, colors, and patterns. The present invention discloses a systematic, flexible, efficient, and novel use of multiple light sources, and enables a wide range of innovative architectural uses of lighting.

12 Claims, 2 Drawing Sheets

METHOD AND APPARATUS FOR LIGHTING

FIELD OF THE INVENTION

The present invention pertains generally to lighting, and more specifically to a method and apparatus for collection from, distribution and control of a plurality of lighting sources in a lighting system connected with a network of optical fibers and components, and electric parts.

BACKGROUND OF THE INVENTION

Electric lighting, a means to supplement natural solar light, offers a number of advantages, yet suffers from several shortcomings. Notwithstanding various improvements to overcome electric lighting's shortcomings, such as new lighting elements to approximate natural solar light quality and/or to achieve better efficiency, the most prevalent complaints of electric lighting include operating and maintenance cost, light quality, and the heat generated in the conversion process from electrons to photons.

Natural solar light, i.e., sunlight, is a very desirable light source for interior use. However, the only widespread application is the limited use of sunlight with direct exposure, e.g., skylight. While there have been attempts to utilize natural sunlight in various setting, there is no system for wide applicability due to their narrow focus in design.

The present invention overcomes the aforementioned limitations with the following objects:

Flexible, efficient, and novel use of natural solar light source;

Compatible with and complementary to other light sources;

New fixture and architectural arrangements;

Energy savings; and

Ease of maintenance due to centralized lighting sources.

Further objects and advantages of the present invention will become apparent from a consideration of the drawings and ensuing description thereof.

DISCUSSION OF PRIOR ART

*Fiber Optics* by Edward A. Lacy, Prentice-Hall, 1982, is a concise and yet practical reference book on fiber optics. *Architectural Physics—Lighting* by R. G. Hopkinson, Her Majesty's Stationery Office, London, 1963 has a comprehensive coverage of lighting in architectural design. *Lighting Handbook* published by Westinghouse Electric Corp. in 1969, and revised in 1978, contains many reference for illumination engineering.

Optical fiber is gaining popularity for decorative lighting applications. There are many creative lighting fixture designs using various electric light sources. There is also optical fiber designed to provide illumination along its length. The distribution system of these early product offerings is very straightforward with multiple strand of optical fibers running from source to fixture. The intended use of fixtures with optical fiber is for isolated installation.

U.S. Pat. No. 4,720,170 discloses a system for use of solar energy in a commercial building. The main focus is to convert solar energy for other use (heating), in addition to a centralized light source incorporating artificial with the natural light source for channelling through a plurality of light "pipes" to the workspaces. Limited control is used with motorized mirrors and shutters.

U.S. Pat. No. 4,246,477 deals with light distribution system using light transmission channel with passive optical components to direct, and to dispense the light. The light transmission channel is constructed using inflexible building materials. Limited control is provided with a light sensing device to control artificial light source, i.e., fluorescent tubes, which are integrated with the natural light output at the fixture in each room.

U.S. Pat. No. 4,761,716 discloses a building design with uses of natural light. U.S. Pat. Nos. 4,785,811 and 4,815,815 continue the use of natural light for medical, and submarine agricultural purposes respectively. The distribution of light once collected is simplistic without integration with multiple sources and without any control features.

U.S. Pat. Nos. 5,285,356, 5,217,285 provide examples of attempts to simulate natural solar light through electrical appliance designs. U.S. Pat. No. 4,820,020 discloses a daylight system with an array of reflectors for increased interior light with limited direct exposure. U.S. Pat. No. 4,557,565 discloses a method using a deflecting panel to direct sunlight into the. interior of a building. U.S. Pat. No. 4,791,533 discloses a system directing sunlight into interior with tilt and direction control. U.S. Pat. Nos. 5,175,967, 5,467,564, 5,655,339, 5,648,873 provide methods to direct natural solar light to area inside a building with direct exposure. U.S. Pat. Nos. 4,943,141, 4,511,755, 5,648,873, 5,467,564 deals with light collecting devices. U.S. Pat. No. 4,669,817 deals with system for time-sharing of light distribution.

U.S. Pat. No. 4,389,085 by Mori discloses a method and apparatus for collecting and distributing sunlight. Mori's control is limited to moving the sunlight collector to track the position of the sun. Mori's disclosure deals with singular light collection system, made up possibly of a complex set of light collecting components, at one end of the transmission system. Furthermore, Mori's embodiments do not integrate electrical light sources with natural sunlight.

U.S. Pat. No. 4,576,436 by Daniel discloses a light system utilizing sunlight with other electrical light sources using a light-conducting rod with a series of beam splitting mirrors. Daniel's invention is to provide a uniform light distribution a long a fixed length light-conducting rod. However, the integration of various light sources is limited to the location of lighting fixtures, and the use of optical fiber cables is limited of the construct to a light splitting device.

SUMMARY OF THE INVENTION

The present invention discloses a method and apparatus for lighting.

A plurality of natural sunlight collecting devices, called collectors, are strategically located in sunny spots on the side or on the roof a building. The collectors can vary in size for ease and cost of manufacturing to achieve the desired light intensity. An array of collectors with or without an accompanying optical network can be used to feed into optical fiber cable (single or multiple stands of optical fiber).

Optical fiber cables with optical components are used for distribution of collected sunlight. Some sections of these optical cables can be placed alongside electrical wiring for ease of installation and access. A bundle of multiple strands of fiber can be used to obtain desired light intensity for cost and ease of handling. The only unique requirement of an optical fiber during the design and installation is the critical turn radius for not breaking its brittle glass or plastic core.

With current optical fiber's clarity, the loss of collected sunlight through this conduit is negligible comparing with any loss at the connection. Optical fiber cable is used in the long haul for its flexibility in routing through building walls and ducts. Other optical devices, such as reflective, refractive, coupler (directional or star), and splitter can be placed along the path to direct or to siphon off light as desired. A light meter or other similar device can be used to measure the light intensity during installation at each junction point.

Other lighting sources (halogen, neon, etc.) can be introduced at any of the connection points to complement the natural light source for use during night time or for different lighting effects. These light sources do not necessarily have a directional and coherent light output, i.e., laser-like. The only requirement is to focus the light source's output at an acceptable angle into the optical fiber, which is an efficient conduit with repeated internal reflection. The design and installation requirements deal with providing sufficient light intensity at the output locations with cost and ease of installation and maintenance as parameters.

An adjuster with electrical or mechanical control can be introduced throughout the system for different effects, e.g., light intensity, color filtration, polarization, blocking, etc. A microprocessor is used to control the lighting system at the collector (tilt and direction control), at the electric light source (dim, pattern, etc.), at the distribution points (proportion of light to be siphoned off), and at each lighting fixture, for constant/varying intensity according to time-of-day, time-of-year, weather condition, lighting effects and patterns according to personal preference and presence, etc.

Various lighting fixtures can be used to provide illumination as called for by the architectural design. The availability of natural light sources coupled with other lighting sources to be effected with an adjuster creates a wide range of possible designs. Another major benefit of the present system is the absence of heat at the lighting fixture.

Therefore, the benefits of the present invention are:

flexibility;

cost;

control; and new architectural possibility.

DETAILED DESCRIPTION OF THE PREFERRED EMBODIMENT

Figure 1:
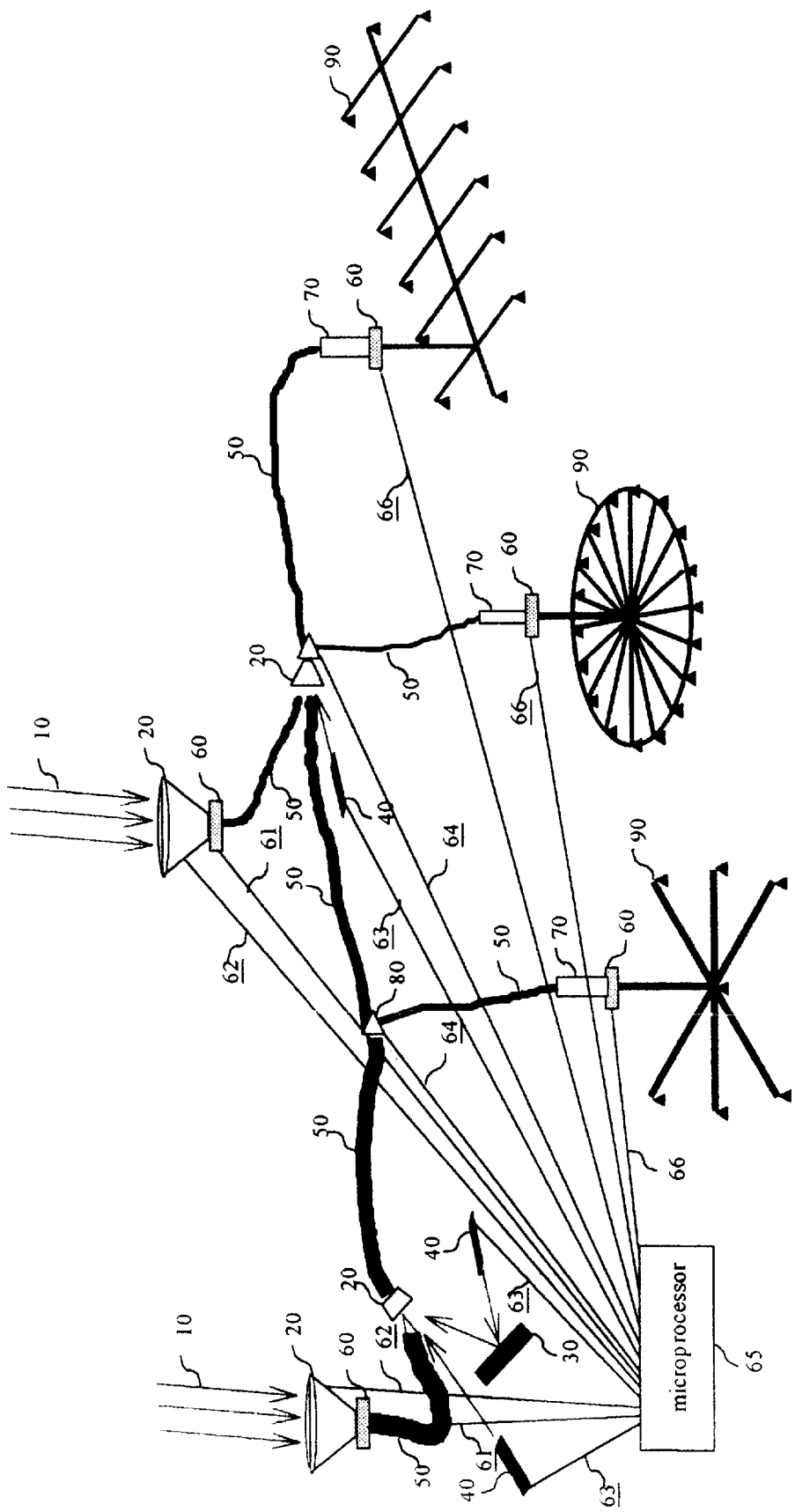
FIG. 1 depicts the system layout of an embodiment.

As illustrated in FIG. 1, a plurality of light collectors 20 are placed in sunny spots on the roof or on the side of a building to gather light from natural light sources, i.e., sunlight 10. The sunlight collector(s) 20 can be constructed using a system of optical components and controlled by the microprocessor via connection 62. The collected sunlight passes through a mechanical or electrical adjuster 60 controlled by the microprocessor via connection 61 before it is channeled using optical fiber cable 50 to a wiring closet where other light sources 40 controlled by the microprocessor via connection 63 can be joined to supplement natural sunlight and/or to achieve desired lighting effects controlled by the microprocessor via connection 64. One of the light sources is illustrated using a mirror 30 in the installation.

The optical fiber cable 50 passes through the wiring duct in the building and desired amount of light is siphoned off using a light splitter 80 controlled by the microprocessor via connection 64 for various illumination purposes. A light connector 70 is used to connect the end of the optical fiber cable to a lighting fixture 90.

An electrical adjuster 60 can be equipped with light sensing device to feed the information to a microprocessor 65 and to be controlled by the microprocessor via connection 61. In this embodiment, the microprocessor is also connected to all the light sources for control. Collectively this sensing and control mechanism allow for complex lighting effect, e.g., constant/varying intensity according to time-of-day, time-of-year, weather condition, lighting effects and patterns according to personal preference and presence, etc.

Figure 2:
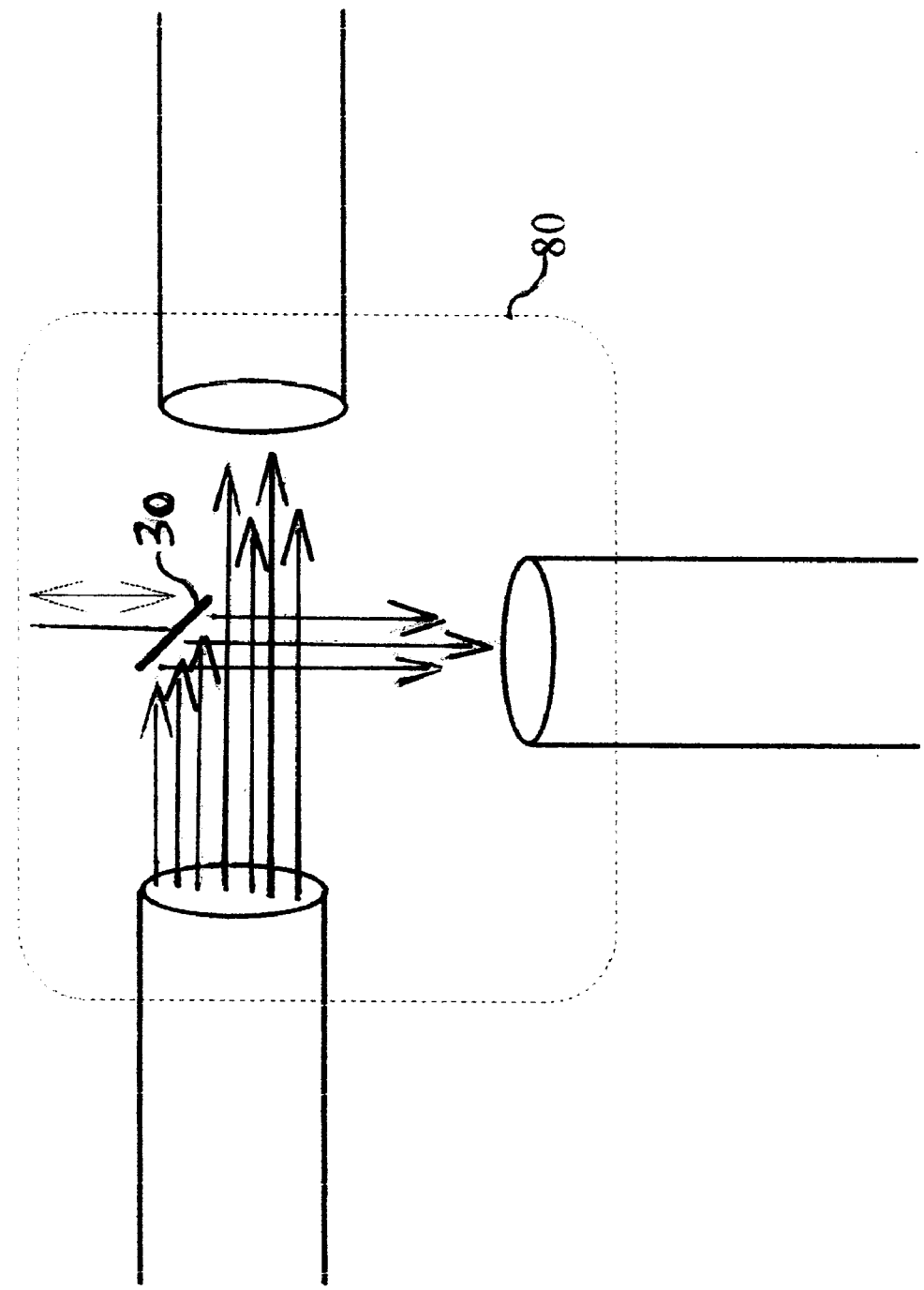
FIG. 2 illustrates one splitter design using motorized mirror for control.

FIG. 2 illustrates a simplistic light splitter design using motorized mirror for control of amount of light to be siphoned off The internal wall of the splitter should be made of highly reflective material to capture stray light rays.

From the foregoing, it will be observed that numerous variations and modifications may be effected without departing from the true spirit and scope of the novel concept of the invention. It should be understood that no limitation with respect to the specific structure and circuit arrangements illustrated is intended or should be inferred. It is, of course, intended to cover by the appended claims all such modifications as fall within the scope of the claims.

Thus, in accordance with the invention, a Method And Apparatus for Lighting has been provided accomplishing all of the objects, and having the features and advantages specified at the beginning of this specification. It is to be understood that the disclosed construction of the invention may be embodied in other forms within the scope of the claims.

What is claimed is:

1. A method of lighting using a plurality of light sources including natural sunlight and artificial light comprising the steps of:

(a) Providing at least one natural light collector;

(b) Providing at least one artificial light source separate from lighting fixtures;

(c) Collecting the light from said at least one natural light collector and said at least one artificial light source;

(d) Distributing said collected light to a plurality of lighting fixtures using a network of fiber optics;

(e) Calculating the required light intensity at each of said plurality of lighting fixtures;

(f) Controlling the amount of light collected by said at least one natural light collector based on said calculated light intensity.

2. In a method of lighting according to claim 1, said step of collecting the light from said at least one natural light collector comprising the step of placing a controllable component at said at least one of natural light collector.

3. In a method of lighting according to claim 1, said step of distributing said collected light to a plurality of lighting fixtures using a network of fiber optics comprising the steps of:

(a) laying a plurality of optical fiber cables from said at least one natural light collector and said at least one artificial light source towards said plurality of lighting fixtures;

(b) aligning the output of each of said at least one natural light collector and said at least one artificial light source to one of said plurality of optical fiber cables;

(c) joining said plurality of optical fiber cables using optical components at a plurality of junction points; and (d) connecting the output of said plurality of optical fiber cables to each of said plurality of lighting fixtures.

4. In a method of lighting according to claim 3, said step of joining said plurality of optical fiber cables comprising the step of placing a controllable component at each of said plurality of junction points.

5. In a method of lighting according to claim 3, said step of joining said plurality of optical fiber cables using optical components comprising the step of monitoring light conditions at each of said optical components.

6. In a method of lighting according to claim 3, said step of joining said plurality of optical fiber cables using optical components comprising the step of controlling output at each of said optical components.

7. In a method of lighting according to claim 1, said step of controlling the amount of light comprising the step of achieving the required light intensities and effects at each of said plurality of lighting fixtures.

8. In a method of lighting according to claim 1, said step of calculating the required light intensity at each of said plurality of lighting fixtures comprising the step of monitoring light conditions at each of said plurality of lighting fixtures.

9. In a method of lighting according to claim 1, said step of collecting the light from said at least one natural light collector comprising the step of monitoring light conditions at each of said at least one natural light collector.

10. In a method of lighting according to claim 1, said step of calculating the required light intensity at each of said plurality of lighting fixtures comprising the step of controlling output at each of said plurality of lighting fixtures.

11. In a method of lighting according to claim 1, said step of collecting the light from said at least one natural light collector comprising the step of controlling output of each of said at least one of natural light collector.

12. An apparatus of lighting using a plurality of light sources including natural sunlight and artificial light comprising the steps of:
  (a) Providing at least one natural light collector means;
  (b) Providing at least one artificial light source separate from lighting fixtures;
  (c) Means for collecting the light from said at least one natural light collector and said at least one artificial light source;
  (d) Means for distributing said collected light to a plurality of lighting fixtures using a network of fiber optics;
  (e) Calculating the required light intensity at each of said plurality of lighting fixtures;
  (f) Controlling the amount of light collected by said at least one natural light collector based on said calculated light intensity.

* * * * *